United States Patent [19]

Weber

[11] Patent Number: 4,548,796

[45] Date of Patent: Oct. 22, 1985

[54] PROCESS FOR THE PRODUCTION OF PURE BURNT LIME

[75] Inventor: Peter Weber, Saal a.d. Donau, Fed. Rep. of Germany

[73] Assignee: SKW Trostberg A.G., Trostberg, Fed. Rep. of Germany

[21] Appl. No.: 512,447

[22] Filed: Jul. 11, 1983

[30] Foreign Application Priority Data

Jul. 17, 1982 [DE] Fed. Rep. of Germany ....... 3226851

[51] Int. Cl.$^4$ .............................................. C01F 11/06
[52] U.S. Cl. ................................... 423/175; 423/637; 423/DIG. 16
[58] Field of Search ............... 423/175, 177, 635, 636, 423/637, DIG. 16; 110/245, 345; 432/15, 16

[56] References Cited

U.S. PATENT DOCUMENTS

| | | | |
|---|---|---|---|
| 2,647,612 | 4/1954 | Murphree | 423/DIG. 16 |
| 2,729,598 | 1/1956 | Garbo | 423/DIG. 16 |
| 2,799,640 | 7/1957 | Pevere et al. | 423/DIG. 16 |
| 3,617,583 | 11/1971 | Moss et al. | 423/637 |
| 4,088,745 | 5/1978 | Godel | 423/DIG. 16 |
| 4,226,839 | 10/1980 | O'Neill et al. | 423/637 |
| 4,368,177 | 1/1983 | Schnabel et al. | 423/637 |
| 4,389,381 | 6/1983 | Dinovo | 423/637 |
| 4,391,671 | 7/1983 | Azarniouch | 423/637 |
| 4,414,186 | 11/1983 | Schmidt et al. | 423/637 |

*Primary Examiner*—L. Dewayne Rutledge
*Assistant Examiner*—Robert L. McDowell
*Attorney, Agent, or Firm*—Kenneth P. Glynn

[57] ABSTRACT

The subject of the invention is a process for the production of pure burnt lime using gaseous fuels produced from energy carriers, in particular industrial wastes, wherein the energy carriers are gasified in an installation consisting of a fluidized bed and a cyclone, and the noxious substances released during the thermal decomposition are separated off by means of adsorbents, before they come into contact with the lime being burned.

30 Claims, No Drawings

PROCESS FOR THE PRODUCTION OF PURE BURNT LIME

The present invention relates to a process for the production of pure burnt lime in a shaft furnace or rotary kiln by means of gaseous fuels produced from energy carriers, in particular industrial wastes. The most diverse types of fuel, such as, for example, fuel oil, natural gas, coke, coal and the like, are used for the burning of the lime. The purity of the lime, which plays an important role in some application fields, such as metallurgy or electrochemistry, depends both on the composition of the limestone used and on the type of the burning installation and process as well as on the fuel itself. For example, a purer lime is obtained with low-sulphur or sulphur-free natural gas than with heavy fuel oil which can contain up to 4% of sulphur. More recently, plastic wastes or rubber wastes are also utilized as an energy source for the lime-burning process. Although cheap fuels can be used in this way, considerable problems arise as a result, both with respect to the treatment of the chemically aggressive gases and dusts produced and to the purity of the burnt lime. Extraneous substances, such as chlorine, sulphur or heavy metals, contaminate the lime to a greater or lesser extent and make it useless for special applications, such as, for example, the treatment of drinking water.

From German Offenlegungsschrift No. 2,647,021, a lime-burning process is known in which scrap tires are utilized for firing a shaft furnace. The decomposition or combustion of the tires likewise takes place in a special firing chamber located outside furnace. Furthermore, the combustion is regulated by setting a clearly defined air factor, and the gaseous constituents thus formed are subjected to further combustion with the bottom-fed air of the shaft furnace. Pure burnt lime is, however, not obtained by this process.

As described in several printed publications (German Offenlegungsschriften Nos. 2,830,125; 2,710,205 and 2,624,971), the wastes can be burned directly in the furnace. Although a better utilization of the calorific value of these fuels is thus achieved, the material being burned is contaminated to a greater or lesser extent by the noxious exit gases and dusts.

It was therefore the object of the invention to develop a process which makes it possible, without large expenditure on equipment, to utilize any energy carriers, in particular also industrial wastes, such as scrap plastic and scrap rubber, as the energy source, while simultaneously obtaining pure burnt lime.

According to the invention, this objective is achieved when the energy carriers are gasified in an installation consisting of a fluidized bed and a cyclone, and the noxious substances released during the thermal decomposition are separated off before they come into contact with the material being burned. In fact, it has surprisingly been found that the noxious substances released during the thermal decomposition are virtually completely separated out if a suitable adsorbent is added to the fluidized bed unit; above all, fine-grained limestone and/or burnt lime and/or other calcareous material, such as, for example, the dust from the exit gas filter of other lime kiln, have proved suitable for this purpose. The respective properties of limestone or burnt lime are of course known (compare German Patent Specification No. 2,459,272, German Auslegeschrift No. 2,331,156 and German Offenlegungsschrift No. 2,721,587); nevertheless, such a process has never been used for the lime-burning process, because it was not to be expected, on the basis of earlier experience, that it would be possible to keep the impurities produced by the fuel away from a material having such a high adsorption capacity as burnt lime. Furthermore, it had to be expected that particularly chlorine-containing and fluorine-containing exit gases would attack the high-grade refractory material of the kiln lining.

In the process according to the invention, industrial wastes such as plastics, rubber, paper, bark and the like, and also other energy carriers, such as, for example, coal wastes or coke wastes, are comminuted, weighed, introduced into the fluidized bed and thermally decomposed in the latter. The fluidized bed is constituted, for example, by fine-grained sand or coal slack, which serves as the heat transfer medium and heat store. The addition of the adsorbent can be carried out either continuously or batchwise. Above all, finely divided limestone and/or burnt lime and/or a calcareous material, such as, for example, the dust from the exit gas filter of lime kiln, and also carbonaceous compounds, such as coke, bituminous coal, activated carbon or carbon black, have proved suitable as adsorbents. The grain size range of the adsorbent is between 0.1 and 10 mm, in particular 0.5–1 mm.

The metering of the adsorbent depends on the noxious substance content of the wastes or on the desired degree of purity of the burnt lime. Due to the intensive thorough mixing of the waste materials with the sand or another fluidizing medium and the adsorbent, the decomposition processes take place within a few minutes at a temperature of 650°–800° C.

For starting the process, the fluidized bed is heated to 450°–500° C. with the aid of hot-gas generators.

As the fluidizing medium, air or an oxygen-containing gas is introduced with the aid of a blower via the inlet distributor tray of the fluidized bed unit. The air serves at the same time as an oxidizing agent, since it is necessary, by partial gasification or combustion, to liberate the quantity of heat which is necessary for heating up the cold air, warming and decomposing the wastes and covering the heat losses at the desired process temperature.

The required air rate depends on the desired throughput. The process temperature or combustion gas temperature is regulated by the air/waste ratio. To prevent the permitted maximum reaction temperatures from being exceeded, an air factor of less than 1, in particular less than 0.5, is generally set. If the industrial wastes have a very high carbon content, it is necessary, for complete combustion, to run with a relatively large air excess which, however, reduces the throughput in most cases and is not suitable for all lime-burning kiln systems.

In a particularly preferred embodiment, it is also possible when wastes having a high carbon content are used, to run with a very low air factor and to use the soot thus formed as the adsorbent.

The hot combustion gases produced in the fluidized bed leave the fluidized bed unit together with the charged adsorbent and are fed to the downstream cyclone. In the latter, the charged adsorbents as well as the remaining pulverulent noxious substances are separated off, so that the industrial waste combustion gas can be withdrawn without contaminants from the cyclone and passed into the combustion chambers of the lime-burning kilns in the absence of fossil fuels.

The examples which follow are intended to explain the invention in more detail without, however, restricting it thereto.

EXAMPLE 1

As an example, the elimination of chlorine from polyvinyl chloride (PVC) will be described.

Scrap plastic material with a substantial PVC content is thermally decomposed at temperatures of about 800° C. in a fluidized bed unit which contains quartz sand as the fluidizing medium; this requires an air factor of about 0.3. The analysis of the waste fuel gives about 20% of chlorine. 150 kg of the fuel are put through per hour. In addition, 50 kg/hour of dust from the exit gas filter of the lime kiln are introduced continuously. 45 kg of calcium chloride in a concentration of 92% are discharged per hour from the cyclone. In addition, this material contains significant amounts of sulphur bonded to lime.

EXAMPLE 2

Shredded refuse containing, inter alia, 24% of non-ferrous metal constituents is introduced, at temperatures between 700° and 800° C., into a fluidized bed unit which, at least for starting, contains quartz sand as the fluidizing medium. 280 kg of the shredded fuel are fed in per hour.

Unless the non-ferrous metals obtained during the gasification process in the fluidized bed are retained in the fluidized bed and are discharged from there sporadically or continuously, they pass on the way to the lime kiln, with the fuel gas formed and together with the noxious substances from the shredded refuse, into the cyclone where they are largely separated out.

What is claimed is:

1. A process for producing pure burnt lime from limestone which comprises:
   a. gasifying industrial waste energy carriers in an installation consisting of a fluidized bed and a cyclone, by thermal decomposition of said industrial waste energy carriers at temperatures between 650° C. and 800° C. so as to produce industrial waster gaseous fuels and so as to release noxious substances during said gasifying;
   b. separating off said noxious substances from said industrial waste gaseous fuels before coming into contact with the limestone to be burnt, said separating off being performed by means of an adsorbent; and,
   c. burning said limestone with said industrial waste gaseous fuels produced from the gasification of said industrial waste energy carriers, the burning of said limestone being in the absence of fossil fuels.

2. Process according to claim 1, wherein the noxious substances are separated off in at least one of the fluidised bed and the cyclone.

3. Process according to claim 1, wherein the adsorbent used is one or more selected from the group consisting of finely divided limestone, burnt lime, and a calcareous material.

4. Process according to claim 3, wherein the adsorbent used is calcerous material which is the dust from the exit gas filter of a lime kiln.

5. Process according to claim 1, wherein carbonaceous substances are employed as the adsorbent.

6. Process according to claim 1, wherein the separation of the noxious substances by means of an adsorbent is carried out continuously.

7. Process according to claim 3, wherein the separation of the noxious substances by means of an adsorbent is carried out continuously.

8. Process according to claim 4, wherein the separation of the noxious substances by means of an adsorbent is carried out continuously.

9. Process according to claim 5, wherein the separation of the noxious substances by means of an adsorbent is carried out continuously.

10. Process according to claim 1, wherein the separation of the noxious substances by means of an adsorbent is carried out batchwise.

11. Process according to claim 3, wherein the separation of the noxious substances by means of an adsorbent is carried out batchwise.

12. Process according to claim 4, wherein the separation of the noxious substances by means of an adsorbent is carried out batchwise.

13. Process according to claim 5, wherein the separation of the noxious substances by means of an adsorbent is carried out batchwise.

14. Process according to claim 1, wherein the quantity of adsorbent is metered in as a function of the noxious substance content of the fuel.

15. Process according to claim 3, wherein the quantity of adsorbent is metered in as a function of the noxious substance content of the fuel.

16. Process according to claim 4, wherein the quantity of adsorbent is metered in as a function of the noxious substance content of the fuel.

17. Process according to claim 5, wherein the quantity of adsorbent is metered in as a function of the noxious substance content of the fuel.

18. Process according to claim 1, wherein the quantity of adsorbent is metered in as a function of the desired degree of purity of the burnt lime.

19. Process according to claim 3, wherein the quantity of adsorbent is metered in as a function of the desired degree of purity of the burnt lime.

20. Process according to claim 4, wherein the quantity of adsorbent is metered in as a function of the desired degree of purity of the burnt lime.

21. Process according to claim 5, wherein the quantity of adsorbent is metered in as a function of the desired degree of purity of the burnt lime.

22. Process according to claim 1, wherein the adsorbent has a particle size of 0.1–10 mm.

23. Process according to claim 3, wherein the adsorbent has a particle size of 0.1–10 mm.

24. Process according to claim 4, wherein the adsorbent has a particle size of 0.1–10 mm.

25. Process according to claim 5, wherein the adsorbent has a particle size of 0.1–10 mm.

26. Process according to claim 1, wherein an air factor of $<1$ is set for temperature control.

27. Process according to claim 2, wherein an air factor of $<1$ is set for temperature control.

28. Process according to claim 3, wherein an air factor of $<1$ is set for temperature control.

29. Process according to claim 4, wherein an air factor of $<1$ is set for temperature control.

30. Process according to claim 5, wherein an air factor of $<1$ is set for temperature control.

* * * * *